(12) United States Patent
Hiraki et al.

(10) Patent No.: US 6,855,430 B2
(45) Date of Patent: Feb. 15, 2005

(54) PARTS FOR CAR BODY

(75) Inventors: Tadayoshi Hiraki, Odawara (JP);
Akira Tominaga, Chigasaki (JP);
Takeshi Yawata, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 115 days.

(21) Appl. No.: 09/969,647

(22) Filed: Oct. 4, 2001

(65) Prior Publication Data
US 2002/0045047 A1 Apr. 18, 2002

(30) Foreign Application Priority Data

Oct. 4, 2000 (JP) ........................................ 2000-304997

(51) Int. Cl.$^7$ .............................................. B32B 27/38
(52) U.S. Cl. ...................... 428/413; 180/89.1; 204/504; 204/505; 428/416; 428/418
(58) Field of Search .................. 180/89.1; 428/413, 428/416, 418; 204/504, 505

(56) References Cited

U.S. PATENT DOCUMENTS

| | | | |
|---|---|---|---|
| 4,810,540 A | 3/1989 | Ellison et al. ................ 428/31 |
| 5,026,448 A | 6/1991 | Reafler et al. ............... 156/212 |
| 5,169,725 A | 12/1992 | Rasmussen et al. ......... 428/458 |
| 5,215,826 A | 6/1993 | Shimanski et al. .......... 428/483 |
| 6,303,707 B1 * | 10/2001 | Nishiguchi et al. .......... 525/528 |
| 6,531,043 B1 * | 3/2003 | Palaika ........................ 204/484 |
| 6,565,966 B2 * | 5/2003 | Hiraki et al. ................ 428/332 |

FOREIGN PATENT DOCUMENTS

| | | |
|---|---|---|
| EP | 0982413 | * 3/2000 |
| EP | 1 125 730 | 8/2001 |
| GB | 2 348 849 | 10/2000 |

* cited by examiner

*Primary Examiner*—Ana Woodward
(74) *Attorney, Agent, or Firm*—Wenderoth, Lind & Ponack, L.L.P.

(57) ABSTRACT

The present invention relates to parts for car body comprising plastic-covered metallic material prepared by sticking a plastic film having a topcoat finishing property on one side or both sides of a molded and electrodeposition coated metallic material and to a coat-finishing process of a car body by using said parts for car body.

48 Claims, 1 Drawing Sheet

Fig. 1

| PLASTIC FILM (CLEAR) |
| PLASTIC FILM (COLORED, TRANSPARENT) |
| PRINT FILM |
| ADHESIVE FILM |
| ELECTRODEPOSITION PAINT FILM |
| STEEL PLATE |

Fig. 2

| SOLID COLOR |
| INTERMEDIATE PAINT FILM |
| ELECTRODEPOSITION PAINT FILM |
| STEEL PLATE |

Fig. 3

| CLEAR PAINT FILM |
| METALLIC PAINT FILM |
| INTERMEDIATE PAINT FILM |
| ELECTRODEPOSITION PAINT FILM |
| STEEL PLATE |

PARTS FOR CAR BODY

BACKGROUND OF THE INVENTION

The present invention relates to parts for car body comprising plastic-covered metallic material obtained by sticking a plastic film having a topcoat finishing property on a molded and electrodeposition coated metallic material and to a coat-finishing process of a car body using said parts for car body for at least a part of the shell body of the car body.

In car bodies of passenger cars and light cars, a part to which equipments such as an engine and a chassis are not installed and which is composed mainly of sheet metal is called "a shell body" and is composed usually of "a main body" composed of an underbody, a side member, a roof, a cowl an upper back and a lower back and "an outer covered part" such as a hood, a front balance, a front fender, a cowl louver, doors and a luggage (back doors).

These main body and outer covered part have so far been formed by cutting, molding and assembling metal plates into sizes and shapes of the respective constitutional parts, immersing them in a cationic electrodeposition paint bath to coat the front sides, back sides and end faces thereof to form primer coat paint films and then applying an intermediate coat paint and a top coat paint on the outside parts.

In recent years, however, step saving, energy saving, a reduction in $CO_2$ and VOC and environmental protection in a coating line are strongly desired in coating car bodies. In addition thereto, a chipping resistance and a corrosion resistance of a combined paint film are requested to be further improved. In order to elevate this chipping resistance, it is proposed to provide a barrier coat for forming a visco-elastic paint film in a layer between these paint films, but there are the defects that a coating step is added and the production cost goes up.

BRIEF SUMMARY OF THE INVENTION

The present inventors have repeatedly conducted studies to satisfy the requirements as mentioned above in the coating of a car body as mentioned above. As a result, this time, they found that the above-mentioned requirements can be satisfied once and at all by coating an electrodeposition paint on a molded metallic material and by sticking a plastic film having a topcoat finishing property on the electrodeposition coated surface without coating an intermediate paint, topcoat paint etc., and completed the present invention.

Thus, according to the present invention there are provided parts for car body comprising plastic-covered metallic material obtained by sticking a plastic film having a topcoat finishing property on one side or both sides of a molded and electrodeposition coated metallic material.

According to the present invention there is also provided a coat-finishing process of a car body characterized by using the above-mentioned parts for car body for at least a part of the shell body of the car body.

BRIEF DESCRIPTION OF THE DRAWINGS

FIGS. 1–3 show cross sections of the multilayered coating films formed in Example 1, Comparative Example 1 and Comparative Example 2, respectively.

DETAILED DESCRIPTION OF THE INVENTION

Then, the parts for car body and the coat-finishing process of a car body by using them of the present invention are described in more detail.

As a car body which can be coat-finished according to the process of the present invention car bodies of passenger cars and light cars can be mentioned as preferable, but car bodies of trucks, buses, motorcycles, vehicles with special kind of equipment etc. can also be mentioned similarly as examples. As metallic materials constituting these car bodies, what has so far been used for car bodies can be applied and therefore, metallic materials therefor include, for example, metal plates of iron, steel stainless steel, aluminum, copper and alloys containing these metals, and metal plates obtained by plating the surfaces thereof with zinc, zinc/nickel and iron, and they can be used by working into the form of a coil or a cut plate. The metal plates have suitably a thickness falling in a range of usually 0.3 to 2 mm, particularly 0.5 to 1 mm. The surfaces of these metal plates are preferably subjected in advance to suitable polishing treatment, degreasing treatment and phosphate treatment in order to elevate an adhesive property with a plastic layer and an anticorrosive property.

According to the present invention such metallic materials are molded and coated with an electrodeposition paint and then a plastic film having a topcoat finishing property is stuck on one side or both sides thereof.

Molding of a metallic material is conducted according to a usual process by cutting the metallic plate in the shape of coils or cut plates into the desired shape and size corresponding to the parts constituting the shell body of a car body and molded by pressing with a pressing machine etc.

Shell body is the principal part of a car body, to which equipments such as an engine, a chassis etc. are not installed, is formed by using mainly sheet metal material and composed usually of "a main body" and "outer covered parts". A main body is composed mainly of an underbody, a side member, a roof, a cowl, an upper back, a lower back etc. Outer covered parts include mainly a hood, a front balance, a front fender, a cowl louver, doors, a luggage (a back door) etc. In the present specification the parts constituting the main body and outer covered parts are in some cases called collectively as "car parts"

Underbody here means the floor part of a passenger compartment (a cabin), a luggage boot etc. and is a collective term for a front underbody, a front floor, a rear floor etc. The side member forms a side face of a cabin in combining with a front body, a roof panel an underbody etc. to prevent the vehicle from bending and torsion. The cowl is a panel for connecting longitudinal and lateral pillars. The upper back is a panel for connecting right and left quarter panels (rear fenders) at the rear part of a car body to form an outside face of the car body.

First, each part such as an underbody, a side member, a roof, a cowl an upper back, a lower back etc. of a main body and a hood, a front balance, a front fender, a cowl louver, a door, a luggage etc. of outer covered parts is prepared by cutting, molding and assembling the metallic material. These cutting, molding and assembling can be conducted by per se known processes. These parts are combined and assembled to form a mainbody to which outer covered parts (car parts) such as a hood, a front balance, a front fender, a cowl louver, a door, a luggage etc. are fixed to prepare a shell body. The combining and assembling of these parts can be conducted according to the conventional processes such as joining with an adhesive, welding, bolting etc.

In the present invention the coating of an electrodeposition paint on a molded metallic material can be conducted, for example, in the following stages.

1) To conduct an electrodeposition coating on each part constituting the main body, for example, an underbody, a side member, a roof, a cowl, an upper back, a lower back etc. in the stage after cutting and molding a metallic material and before assembling into the main body.

2) To conduct an electrodeposition coating on the parts of outer covered parts, for example, a hood, a front balance, a front fender, a cowl louver, a door, a luggage etc. in the stage after cutting and molding a metallic material and before fixing the outer covered parts to the main body.

3) To conduct an electrodeposition coating on the main body which has been formed by assembling the parts described in the above-mentioned 1).

4) To conduct an electrodeposition coating on the shell body which has been formed by fixing the outer covered parts described in the above-mentioned 2) to the main body.

Either an anionic type or a cationic type can be used as the electrodeposition paint and usually, a cationic type electrodeposition paint providing a good corrosion resistance is preferably used.

Known ones can be used as the cationic electrodeposition paint and, for example, a paint containing a base resin having a hydroxyl group and a cationic group and a blocked polyisocyanate compound (a crosslinking agent) is suitably used. In this case, conventionally known ones can be used for the base resin and include, for example, reaction products of polyepoxy resins with cationizing agents; products obtained by protonating polycondensation products of polycarboxylic acids and polyamines with acids (refer to U.S. Pat. No. 2,450,940); products obtained by protonating polyaddition products of polyisocyanate compounds, polyols and mono- or polyamines with acids, products obtained by protonating copolymers of acryl base or vinyl base monomers containing a hydroxyl group and an amino group with acids (refer to Japanese Patent Publication No. 12395/1970 and Japanese Patent Publication No. 12396/1970); and products obtained by protonating adducts of polycarboxylic acids to alkyleneimines with acids (refer to U.S. Pat. No. 3,403,088). Among them, a base resin prepared by reacting a cationizing agent with a polyepoxy resin obtained by reacting a polyphenol compound with epichlorohydrin is particularly preferred because of an excellent corrosion resistance thereof.

As said polyphenol compound there can be mentioned, for example, bis(4-hydroxyphenyl)-2,2-propane, 4,4-dihydroxybenzophenone, bis(4-hydroxyphenyl)-1-ethane, bis(4-hydroxyphenyl)-1,1-isobutane, bis(4-hydroxy-tert-butyl-phenyl)2,2-propane, bis(2-hydroxybutyl)methane, 1,5-dihydroxynaphthalene, bis(2,4-dihydroxyphenyl)-methane, tetra(4-hydroxyphenyl)-1,1,2,2-ethane, 4,4'-dihydroxydiphenyl ether, 4,4'-dihydroxydiphenylsulfone, phenol novolac, cresol novolac etc.

The cationizing agent includes, for example, amine compounds such as primary amines, secondary amines, tertiary amines and polyamines. Further, basic compounds such as ammonia, hydroxylamine, hydrazine, hydroxylethylhydrazine and N-hydroxylethylmidazoline may be used as the cationizing agent and allowed to be reacted with an epoxy group of a base resin, and a basic group formed thereby may be protonated into a cationic group with an acid.

As the hydroxyl group which the base resin has, for example, a primary hydroxyl group introduced by a reaction with an alkanolamine used as a cationizing agent, is preferable due to the excellent crosslinking reactivity with a blocked polyisocyanate compound (crosslinking agent). Content of hydroxyl group of the base resin is suitably in the range of 20–5000, particularly 100–1000 mgKOH/g as hydroxyl group equivalent, and particularly it is preferable that the primary hydroxyl group equivalent is in the range of 200–1000 mgKOH/g.

Blocked polyisocyanate compound as a crosslinking agent is a polyisocyanate compound whose isocyanate groups are substantially all blocked with a blocking agent, which dissociates when heated higher than a designated temperature (for example, baking temperature of the paint film) and the regenerated isocyanate group participates in the crosslinking reaction with the base resin.

As a polyisocyanate compound there can be mentioned aliphatic diisocyanates, alicyclic diisocyanates, aromatic diisocyanates; urethanization adducts, biuret type adducts, isocyanuric ring type adducts of these polyisocyanate compounds etc. As a blocking agent there can be used any optional blocking agent such as phenol type, alcohol type, active methylene type, mercaptan type, acid amide type, imide type, amine type, imidazole type, urea type, carbamic acid type, imine type, oxime type, sulfurous acid type, lactam type etc.

Compounding ratio of a base resin and a blocked polyisocyanate compound in an electrodeposition paint is not strictly limited but is preferably in the range of generally 40–90%, particularly 50–80% of the base resin and 60–10%, particularly 50–20% of the blocked polyisocyanate compound based upon the total solid content weight of both components.

A cationic electrodeposition paint can be prepared by neutralizing the cationic groups in the base resin with an acid compound such as acetic acid, formic acid, lactic acid, phosphoric acid etc. and then mixing with the blocked polyisocyanate compound in water. Its pH at the time of coating is suitably in the range of generally 3–9, particularly 5–7 and the solid content concentration is suitably in the range of 5–30% by weight.

The cationic electrodeposition paint can suitably be compounded, if necessary, with a curing catalyst having a corrosion resistance such as hydroxides, oxides, organic acid salts and inorganic acid salts of metals selected from aluminum, nickel zinc, strontium, lead, zirconium, molybdenum, tin, antimony, lanthanum, tungsten and bismuth, various color pigments such as color pigments, extender pigments and anticorrosion pigments; and precipitation preventives.

Electrodeposition coating can be conducted on a molded metallic material in the stage described in any of the aforementioned 1)–4) by a usual process. For example, an electrodeposition paint film can be deposited to exposed metal parts such as both faces and end face parts of a metallic material by immersing said molded metallic material into a cationic electrodeposition paint bath, whose solid content rate is adjusted to 5–40% by weight, as a cathode and conducting an electrodeposition coating for 1–10 minutes of passing a current, at 20–35° C. of bath temperature and 100–400V of voltage. The film thickness of the electrodeposition paint film is preferably in the range of generally about 10–about 40 $\mu$m at a flat part based upon a cured film. After coating the metallic material is drawn up from the electrodeposition paint bath, washed suitably with water and heated to about 100–about 200° C., particularly about 120–180 for about 10–40 minutes to cure the electrodeposition paint film.

According to the present invention a plastic film is stuck on the electrodeposition coated surface of the metallic material which has been molded and electrodeposition coated as mentioned above. The metallic material, which has been electrodeposition coated in the aforementioned stage 1), 2) or 3), is subjected to be stuck with a plastic film usually on the electrodeposition coated surface formed in the respective stage. Optionally, however, a plastic film may be stuck after the metallic material, which was electrodeposition coated in each stage, has been assembled to some extent, for example, after a main body has been formed by assembling the parts which were electrodeposition coated in the aforementioned stage 1). In that case the plastic film must be stuck at least on the face located at the outside in the state after the car body has been assembled (external surface). Optionally, however, it may be stuck also on the reverse face (internal surface).

As a plastic film to be stuck it is preferable to use a film of a material having a topcoat finishing property. The term "topcoat finishing property" is used to mean that said film has similar or better performance than the paint film performance that a topcoat paint such as solid color paint, metallic paint, clear paint etc., that is usually painted on the external surface of a car body, has, such as weatherability, smoothness, beautifulness (designability) etc.

As material of such plastic film having a topcoat finishing property there can be mentioned, for example, stretched polypropylene, polyester resin, polycarbonate resin, epoxy resin, vinyl acetate resin, fluororesin, polyvinyl acetal resin, polyvinylidene chloride resin, polyvinyl alcohol resin, polyamide resin, polystyrene, acrylic resin, polyurethane resin, polyether resin etc. Among them, acrylic resin, fluororesin, polyurethane resin etc. have an excellent weatherability and polyester resin, polycarbonate resin, polyvinylidene chloride resin, polyamide resin etc. do not easily transmit ultraviolet rays in the film state and therefore they can be preferably used.

Plastic film can be prepared by molding the above-mentioned resin material into film shape by, for example, extrusion molding, injection molding, calender molding, compression molding etc. and its thickness is preferably in the range of usually 10–200 μm, particulary 20–150 μm, more particulary 20–100 μm.

The plastic film may be colorless and transparent, colored and transparent or colored and opaque. Generally, however, it is preferable to be colored in solid color tone, metallic tone, iridescent tone etc. to give a beautifulness. Coloring of a film can be conducted by including pigments having these tones in the film by known processes or by painting color paints having these tones on the surface and/or reverse side of the film. As a color paint known solid color paints, metallic paints and iridescent paints mainly for plastic use and their paint film thickness is preferably in the range of usually 1–30 μm, particularly 5–15 μm as a cured film.

It is possible to give to a colorless and transparent, colored and transparent or colored and opaque plastic film, letters, modified letters, marks, symbols, illustrations, various pictures, picture patterns and their combinations etc. (hereinafter referred to collectively as "pattern") with which designability, good outlook, originality, discrimination etc. can be expressed at the outer parts of the shell body. Tone of such a pattern can be solid color tone, metallic tone, iridescent tone etc. and can be constituted in single color, multicolor, mixed color, compound color, gradation, shades of color etc. A pattern can be formed on either side or both sides of the film.

Patterning of plastic film can be conducted, for example, by printing using a printing ink or by coating with a color paint. As printing ink and paint per se known products can be used and they consist of generally coloring materials (pigments, dyestuffs), resin or fat and oil and solvent, and further, as necessary, plasticizers and additives (for example, wax, dryer, dispersant, wetting agent, emulsifier, skinning preventing agent, stabilizer etc.). As coloring material there can be mentioned, for example, inorganic pigments such as titanium oxide, carbon black, aluminium powder, bronze powder etc.; organic pigments such as disazo yellow, brilliant carmine, lake red, phthalocyanine blue, methyl violet lake etc.; fluorescent pigments; dyestuffs (acid dyes, basic dyes, oil colors, disperse dyes) such as eosine, victoria blue, nigrosine, disperse red etc. As resin there can be mentioned, for example, chlorinated polypropylene, acrylic resin, petroleum resin, polyester resin, alkyd resin, polyamide resin, polyurethane resin, rubber type resin etc. As solvent organic solvents, water etc. can be used.

As printing ink and paint prepared from these components there can be mentioned, for example, evaporation drying type, reaction curing type, oxidation polymerization type, thermosetting type, 1-liquid curing type, multiliquid curing type, ultraviolet curing type etc.

Printing with a printing ink onto a plastic film can be conducted by per se known methods. As printing plate there can be used letterpress plate, lithographic plate, copper plate, stencil plate etc. As printing method there can be used, for example, lithography, letterpress printing, copper plate printing, screen printing, flexography, gravure, offset printing, electronic photography, thermal transfer printing, ink jet printing, magnetography, electronic printer, direct printing, dye lithography, dips, delphi, double-sided printing etc. according to the patterns to be given. Further, it is possible to print a pattern with a cubic effect or high-class feeling by halftone printing, photo printing, multiple printing etc. Furthermore, as method of forming pattern on a plastic film by using a paint there can be used, for example, in addition to the above-mentioned printing methods, brushing, spray coating, airless coating, electrostatic coating etc.

Printing with a printing ink and coating with a paint onto a plastic film can be conducted either one side, surface or back, or both sides of said film. In case the backside (the side touching the metal plate) is printed or coated, it is preferable to use a colorless-transparent or colored-transparent plastic film, because the pattern will be seen through the plastic film.

Moreover, it is possible to use as a plastic film a laminated film made by laminating more than 2 sheets of films so that the plastic film (a), which has been colored in solid color tone, metallic tone, iridescent tone etc. and/or patterned, is in the bottom layer and the colorless and transparent, or colored and transparent plastic film (b) is in the upper layer. In this case it is preferable to laminate in selecting as the film (a) one that is relatively soft and transmits little or no light at all and as the film (b) one that transmits light and has excellent weatherability, acid resistance etc. In that case it is preferable to previously coat an adhesive of rubber type, acrylic resin type, silicone resin type, vinyl resin type etc. on the surfaces to be glued of the film (a) and /or film (b). Thickness of each film in the laminated film of the film (a) and film (b) is suitably in the range of generally 5–40 μm, particularly 10–30 μm of the film (a) and 10–200 μm, particularly 20–100 μm of the film (b).

Sticking of a plastic film on a molded and electrodeposition coated metallic material can be conducted by per se known processes. Specifically there can be mentioned, for example, processes by sticking by vacuum pressure stick process, pressure stick process etc. after activating the film and/or metallic material by heating or moistening the surface to be glued by applying an organic solvent.

Vacuum pressure stick process is conducted, for example, by coating an adhesive on the plastic film and/or metallic material and, after drying, softening the film through heating it higher than its softening point and by sticking the film to the metallic material in exhausting the air between the film and the metallic material and reducing pressure in a closed atmosphere. In order to simplify the operation of film sticking, it is preferable to stick a release sheet on the surface of the film on which the adhesive has been coated and to stick an application film on the other side of the film. The plastic film on which a release sheet and an application film have been stuck in such a way is first cut in the prescribed size based upon the size and shape of the part to be stuck, then released from the release sheet and stuck to the objective part. It is preferable, in that case, to prevent the film from wrinkling in order not to draw air between the film and the metallic material. After sticking the sticking operation is completed by peeling off the application film.

As an adhesive usable when the film is stuck on the electrodeposition coated surface there can be mentioned, for example, adhesives of rubber type, acrylic resin type, silicone resin type, vinyl resin type etc. Further, adhesives selected from thermosetting acrylic resin, aminoplast resin, polyester resin, urethane resin, polysiloxane resin etc. are also usable. Adhesive can be coated on either side or both sides of the electrodeposition coated surface of the metallic material and the plastic film and the coating can be conducted by roll coater, curtain flow coater, dip coating, spray coating, electrostatic coating etc. Coating film thickness of adhesive is preferably in the range of usually 1–20 μm, particularly 3–15 μm based upon a coating after volatile components were evaporated.

On the other hand, pressure stick process can be conducted, for example, by sticking the plastic film on the metallic material under pressure with pressing roll The sticking under pressure is preferably conducted by using a pressing roll heated to higher than 50° C., particularly 80–200° C. In that case it is preferable to previously coat an adhesive on the electrodeposition coated surface of the metallic material and/or the surface to be stuck of the plastic film in order to improve the adhesivity between the electrodeposition coated surface of the metallic material and the surface of the plastic film. As such an adhesive there can be mentioned thermosetting resin compositions containing as main component one or more resins selected from, for example, acrylic resin type, rubber type, epoxy resin type (for example, bisphenol type epoxy resin, resol type epoxy resin), urethane resin type, polyester resin type, polyolefin type, polysiloxane resin etc. and compounded, as necessary, with crosslinking agent such as melamine resin, polyisocyanate compound etc. Further, there can be used as adhesive triazinethiol type compounds such as 2,4,6-trimercapto-S-triazine, 2-dibutylamino-4,6-dimercapto-S-triazine, 2,4,6-trimercapto-S-triazine-monosodium salt, 2,4,6-trimercapto-S-triazine-trisodium salt etc.

Coating of an adhesive can be conducted, for example, by roll coater, curtain coater, flow coater, die coater, spray etc. and its coating film is preferably half cured by heating at a temperature of about 60–about 180. Its film thickness is preferably in the range of 0.1–20 μm, particularly 1–5 μm as cured coating film.

In case the plastic film is a laminated film as previously mentioned, it is preferable to stick the film, in which the film (a) and film (b) have previously been laminated as previously mentioned, on the electrodeposition coated surface of the electrodeposition coated metallic material. It is also possible, however, to stick the film (a) first on the electrodeposition coated surface of the electrodeposition coated metallic material and then to further stick the film (b) on the film (a) as mentioned above.

The parts for car body comprising the plastic-covered metallic material according to the present invention prepared as mentioned above are, in case they are not a shell body, assembled into a shell body together with parts for car body which are optionally not covered with plastics.

At least the outside, and at least a part of it, of the shell body formed by using the plastic-covered metallic material according to the present invention is covered with a monolayered or multilayered plastic film and further it is preferable that the reverse side is covered with plastics, though an electrodeposition coated surface is exposed in some cases.

In a car body of a passenger car or a light car formed according to the present invention, particularly in a shell body formed mainly of a plate-shaped metallic material, to which equipments such as an engine, a chassis etc. are not installed, which is composed of a main body composed of an underbody, a side member, a roof, a cowl an upper back, a lower back etc. and of outer covered parts such as a hood, a front balance, a front fender, a cowl louver, doors, a luggage (a back door) etc., the plastic-covered metallic material according to the present invention prepared by electrodeposition coating and then sticking a plastic film, is used in at least a part of the metallic material surface located at the outside of the car body. More preferably the plastic-covered metallic material according to the present invention is used in a part or all of the outer covered parts such as a hood, a front balance, a front fender, a cowl louver, doors, a luggage (a back door) etc. Further more preferably the plastic-covered metallic material according to the present invention is used, in addition to them, in a part or all of the main body composed of an underbody, a side member, a roof, a cowl, an upper back, a lower back etc. Moreover the plastic film can be stuck on other parts, for example, on the reverse side, if desired.

Though it is desirable in the present invention that substantially all parts for car body composing a shell body is the plastic-covered metallic material according to the present invention, in case, on the other hand, a part of the shell body is composed of the parts for car body comprising a metallic material, which has not been covered with plastics, it is also possible that the metallic material is electrodeposition coated as previously mentioned according to a usual coating process for a car body and, after further coated with an intermediate paint and a topcoat paint, fitted with the parts using a plastic-covered metallic material. As an intermediate paint it is preferable to use a paint made by compounding color pigment, extender pigment etc. to a resin composition containing a crosslinking agent such as melamine resin, (blocked) polyisocyanate compound etc. to a base resin such as acrylic resin, polyester resin etc. having functional groups such as hydroxyl group etc. Further, as a topcoat paint it is preferable to use a color paint, forming a solid color or metallic coating film, made by compounding color pigment, iridescent pigment, metallic pigment etc. to a resin composition containing a crosslinking agent such as melamine resin, (blocked) polyisocyanate compound etc. to a base resin such as acrylic resin, polyester resin etc. having functional groups such as hydroxyl group etc. It is also possible to coat a clear paint further on the coating film of the topcoat paint. As a clear paint it is preferable to use a paint comprising a thermosetting resin composition made by containing a crosslinking agent such as melamine resin, (blocked) polyisocyanate compound etc. to a base resin such as acrylic resin, polyester resin etc. having functional groups such as hydroxyl group etc.

In the plastic-covered metallic material according to the present invention the electrodeposition paint film functions as an undercoat paint film giving a corrosion resistance etc. and the plastic film stuck thereon has a performance as a topcoat film. Moreover, a chipping resistance etc. of the plastic-covered metallic material can be improved by applying an adhesive having intermediate painting function to improve an adhesion between the electrodeposition paint film and the film. Furthermore, as the plastic film a colored and/or patterned plastic film and a colorless and transparent, or colored and transparent film are used together (laminated), a multilayered topcoat film can be formed and thus further improvement of an acid resistance, scratch resistance, weatherability etc. is possible.

Using of the parts for car body according to the present invention contributes to a great extent to resources saving, step saving and energy saving in the coating line, reduction of $CO_2$ and VOC and environmental protection etc., because only a water-borne electrodeposition paint is used as paint at the assembling shop of car bodies and no intermediate paint or topcoat paint containing a large amount of volatile substances such as organic solvents etc. is necessary to be used.

As the plastic-covered metallic material used in the present invention is excellent in corrosion resistance, adhesion etc., generates little peeling, lifting, blistering etc. of the plastic layer even after a long lapse of time, and the plastic layer does not peel off even strongly hit by a pebble etc., the material is most suitable to the forming of a car body requiring such performances.

The present invention will be described more specifically by Examples. Parts and % are by weight and the film thickness of the paint film is that of the cured paint film.

1. PREPARATION OF SAMPLES

1) Metallic Material: Alloyed molten zinc-plated steel plate for car body was treated with "PBL3020" (zinc phosphate type surface treatment agent made by Nihon Parkerizing Co., Ltd., trade name).

2) Cationic Electrodeposition Paint: A cationic electrodeposition paint with solid content 20% by weight and PH 6.5 prepared by neutralizing the vehicle component polyamide-modified epoxy resin/blocked polyisocyanate compound with acetic acid.

3) Multilayered Plastic Film (a): On one side of the surface of a blue, transparent polyester resin film (16 μm thick), both sides of which had been treated by corona discharge, a spotted pattern was printed by gravure with 5 colors: 4 colored inks and a white ink (film thickness 3 μm). After drying the film at room temperature for 5 minutes, a thermosetting polyester resin type adhesive (*1) was coated on its printed surface to a film thickness 7 μm and the film was heated at 120° C. for 30 seconds to obtain a patterned plastic film. Then a multilayered plastic film was obtained by thermally presssticking an acrylic resin type transparent film ("AcryplainHBS006" made by Mitsubishi Rayon Co., Ltd. 20 μm thick, trade name) on the surface of the film.

(*1) Thermosetting polyester resin type adhesive: A solution with solid content 30% obtained by mixing and dispersing 90 parts of "ElitelUE3200" (polyester resin made by Unitika Ltd.) and 10 parts of "DuranateTPA100" (hexamethylelediisocyanate type polyisocyanate compound made by Asahi Chemical Industry Co., Ltd., trade name) in the mixed solvent (methyl ethyl ketone/toluene=50/50 by weight).

4) Intermediate Paint:

An intermediate paint obtained by compounding 100 parts of titanium white pigment for 100 parts by weight of the vehicle component comprising 75 parts of soybean oil-modified alkyd resin (oil length 15%, hydroxyl value 80, acid value 15) and 25 parts of butyl etherified methyl melamine resin (solid content ratio).

5) Topcoat Paint a) Solid Color Paint: An organic solvent type solid color topcoat paint obtained by compounding 100 parts of titanium white pigment for 100 parts by weight of the vehicle component comprising 70 parts of oil-free alkyd resin (hydroxyl value 80, acid value 10) and 30 parts of butyl etherified methyl melamine resin (solid content ratio).

b) Metallic Paint: An organic solvent type metallic topcoat paint obtained by compounding 30 parts of aluminum flake pigment for 100 parts by weight of the vehicle component comprising 75 parts of acrylic resin (number-average molecular weight 30000, hydroxyl value 100) and 25 parts of butyl etherified methyl melamine resin (solid content ratio).

c) Clear Paint: An organic solvent type clear topcoat paint comprising 70 parts of acrylic resin (number-average molecular weight 15000, hydroxyl value 100) and 30 parts of butyl etherified methyl melamine resin (solid content ratio).

2. EXAMPLES AND COMPARATIVE EXAMPLES

Example 1

The cationic electrodeposition paint was coated on the metallic material by a usual process and the paint film was cured by heating at 170° C. for 30 minutes (film thickness 20 μm). Then the multilayered plastic film (a) was stuck on the surface located at the outside of the electrodeposition coated metallic material so that the surface of the film coated with the adhesive (*1) touches the electrodeposition coated surface and the plastic-covered metallic plate for car the present invention aims at was obtained by sticking the multilayered plastic film (a) on the electrodeposition coated surface by heating at 120° C. for 30 minutes.

Comparative Example 1

The cationic electrodeposition paint was coated on the metallic material by a usual process and the paint film was cured by heating at 170° C. for 30 minutes (film thickness 20 μm). Then the intermediate paint was painted on the surface located at the outside of the electrodeposition coated metallic material to the film thickness 25–30 μm. After the paint film was cured by heating at 140° C. for 30 minutes, the solid color paint was painted on the painted surface to the film thickness 25–30 μm, kept at room temperature for 3 minutes and then the paint film was cured by heating at 140° C. for 30 minutes.

Comparative Example 2

The cationic electrodeposition paint was coated on the metallic material by a usual process and the paint film was cured by heating at 170° C. for 30 minutes (film thickness 20 μm). Then the intermediate paint was painted on the surface located at the outside of the electrodeposition coated metallic material to the film thickness 25–30 μm. After the paint film was cured by heating at 140° C. for 30 minutes, the metallic paint was painted on the painted surface to the film thickness 15 μm, kept at room temperature for 3 minutes and then the clear paint was painted to the film thickness 25–30 μm and both paint films were simultaneously cured by heating at 140° C. for 30 minutes.

3. Performance Test Results

Various performance tests were conducted on the coated metallic materials obtained by Examples and Comparative Examples. The results are shown in Table 1. Cross sections of the multilayered coating film formed by Example 1 and Comparative Examples 1–2 are shown in FIGS. 1–3. FIG. 1 is the cross section of the multilayered coating film formed by Example 1, and FIG. 2, Comparative Example 1 and FIG. 3, Comparative Example 2, respectively.

TABLE 1

|  | Example | Comparative Example | |
|---|---|---|---|
|  | 1 | 1 | 2 |
| Corrosion resistance | ○ | Δ | Δ |
| Chipping resistance | ○ | Δ | Δ |
| Finishing property | ○ | ○ | ○ |
| VOC (g/ml) | 2 | 50 | 98 |

Test Methods

Corrosion Resistance:

After a part of the coated metallic material was cut off and a cross-cut was made to the coated film reaching to the ground surface by a cutter, a 480-hour test with salt spray was conducted and the width of the generated rust, blister etc. was observed.

○ shows that the width of the generated rust or blistering is less than 1 mm from the cut position, Δ shows that the width is 1–5 mm, and ×, more than 5 mm.

Chipping Resistance:

Using QCR-Gravelometer (made by Q-PANEL Co., Ltd., trade name) 500 ml of crushed stones with 15–20 mm diameter were blown onto the plastic film surface or paint film surface at −20° C. by an air pressure of about 4 kg/cm$^2$ and after that the surface was visually observed.

○ shows that little chipping of the surface layer film or paint film is observed, Δ shows that a little chipping of the surface rayer film or paint film is observed and a little chipping of the film or paint film of the lower layer is observed, too, and × shows that much chipping of the surface rayer film or paint film is observed and chipping of the bottom layer electrodeposition paint film, too.

Finishing Property:

The film or paint film of the top layer was visually observed.

○ shows that smoothness, glossy appearance etc. are good, Δ shows that smoothness, glossy appearance etc. are a little inferior, and × shows that smoothness, glossy appearance etc. are very inferior.

VOC: Calculated by the following formula.

Amount of used paint=(paint film thickness×paint film specific gravity×painted area)/[(solid content rate of diluted paint/100)× painting efficiency]

VOC per piece=amount of used paint×VOC in paint/100

VOC (g/m$^2$)=VOC per piece/painted area (total surface)

What is claimed is:

1. A process for manufacturing a part for a car body which comprises
    (a) electrodeposition coating a molded metallic material with a cationic electrodeposition paint comprising a base resin and a blocked polyisocyanate compound, the base resin being prepared by reacting a cationizing agent with a polyepoxy resin obtained by reacting a polyphenol compound with epichlorohydrin; and
    (b) sticking a preformed plastic film having a topcoat finishing property on the cationic electrodeposition-coated surface of one side or both sides of the molded metallic material.

2. The process for manufacturing a part for a car body set forth in claim 1 wherein the plastic film is a film of a resin having weatherability selected from the group consisting of acrylic resin, fluororesin and polyurethane resin.

3. A car body wherein the part for a car body manufactured by the process set forth in claim 2 is used at least as part of the shell body.

4. A process for producing a car body which comprises assembling parts to form a shell body of the car body, wherein at least a portion of the shell body comprises the part for a car body manufactured by the process set forth in claim 2.

5. A car body produced by the process set forth in claim 4.

6. The process for manufacturing a part for a car body set forth in claim 1 wherein the plastic film is a film of a resin selected from the group consisting of polyester resin, polycarbonate resin, polyvinylidene chloride and polyamide resin.

7. A car body wherein the part for a car body manufactured by the process set forth in claim 6 is used at least as part of the shell body.

8. A process for producing a car body which comprises assembling parts to form a shell body of the car body, wherein at least a portion of the shell body comprises the part for a car body manufactured by the process set forth in claim 6.

9. A car body produced by the process set forth in claim 8.

10. The process for manufacturing a part for a car body set forth in claim 1 wherein the plastic film has a thickness in the range of 10–200 μm.

11. A car body wherein the part for a car body manufactured by the process set forth in claim 10 is used at least as part of the shell body.

12. A process for producing a car body which comprises assembling parts to form a shell body of the car body, wherein at least a portion of the shell body comprises the part for a car body manufactured by the process set forth in claim 10.

13. A car body produced by the process set forth in claim 12.

14. The process for manufacturing a part for a car body set forth in claim 1 wherein the plastic film is colored in solid color tone, metallic tone or iridescent tone.

15. A car body wherein the part for a car body manufactured by the process set forth in claim 14 is used at least as part of the shell body.

16. A process for producing a car body which comprises assembling parts to form a shell body of the car body, wherein at least a portion of the shell body comprises the part for a car body manufactured by the process set forth in claim 14.

17. A car body produced by the process set forth in claim 16.

18. The process for manufacturing a part for a car body set forth in claim 1 wherein the plastic film is a patterned plastic film.

19. A car body wherein the part for a car body manufactured by the process set forth in claim 18 is used at least as part of the shell body.

20. A process for producing a car body which comprises assembling parts to form a shell body of the car body, wherein at least a portion of the shell body comprises the part for a car body manufactured by the process set forth in claim 18.

21. A car body produced by the process set forth in claim 20.

22. The process for manufacturing a part for a car body set forth in claim 18 wherein the patterning of the plastic film is conducted by printing with a printing ink or by coating with a color paint.

23. A car body wherein the part for a car body manufactured by the process set forth in claim 22 is used at least as part of the shell body.

24. A process for producing a car body which comprises assembling parts to form a shell body of the car body, wherein at least a portion of the shell body comprises the part for a car body manufactured by the process set forth in claim 22.

25. A car body produced by the process set forth in claim 24.

26. The process for manufacturing a part for a car body set forth in claim 1 wherein the plastic film is a multilayered plastic film composed of a patterned plastic film and a transparent plastic film.

27. A car body wherein the part for a car body manufactured by the process set forth in claim 26 is used at least as part of the shell body.

28. A process for producing a car body which comprises assembling parts to form a shell body of the car body, wherein at least a portion of the shell body comprises the part for a car body manufactured by the process set forth in claim 26.

29. A car body produced by the process set forth in claim 28.

30. The process for manufacturing a part for a car body set forth in claim 1 wherein the plastic film is stuck on the electrodeposition coated metallic material through the intermediary of an adhesive layer.

31. A car body wherein the part for a car body manufactured by the process set forth in claim 30 is used at least as part of the shell body.

32. A process for producing a car body which comprises assembling parts to form a shell body of the car body, wherein at least a portion of the shell body comprises the part for a car body manufactured by the process set forth in claim 30.

33. A car body produced by the process set forth in claim 32.

34. The process for manufacturing a part for a car body set forth in claim 1 wherein the plastic film is stuck at least on the face located at the outside of a car body of the electrodeposition coated metallic material.

35. A car body wherein the part for a car body manufactured by the process set forth in claim 34 is used at least as part of the shell body.

36. A process for producing a car body which comprises assembling parts to form a shell body of the car body, wherein at least a portion of the shell body comprises the part for a car body manufactured by the process set forth in claim 34.

37. A car body produced by the process set forth in claim 36.

38. The process for manufacturing a part for a car body set forth in claim 1 wherein the molded and electrodeposition coated metallic material is the main body of a car body.

39. A car body wherein the part for a car body manufactured by the process set forth in claim 38 is used at least as part of the shell body.

40. A process for producing a car body which comprises assembling parts to form a shell body of the car body, wherein at least a portion of the shell body comprises the part for a car body manufactured by the process set forth in claim 38.

41. A car body produced by the process set forth in claim 40.

42. The process for manufacturing a part for a car body set forth in claim 1 wherein the molded and electrodeposition coated metallic material is the outer covered parts.

43. A car body wherein the part for a car body manufactured by the process set forth in claim 42 is used at least as part of the shell body.

44. A process for producing a car body which comprises assembling parts to form a shell body of the car body, wherein at least a portion of the shell body comprises the part for a car body manufactured by the process set forth in claim 42.

45. A car body produced by the process set forth in claim 44.

46. A car body wherein the part for a car body manufactured by the process set forth in claim 1 is used at least as part of the shell body.

47. A process for producing a car body which comprises assembling parts to form a shell body of the car body, wherein at least a portion of the shell body comprises the part for a car body manufactured by the process set forth in claim 1.

48. A car body produced by the process set forth in claim 47.

* * * * *